UNITED STATES PATENT OFFICE.

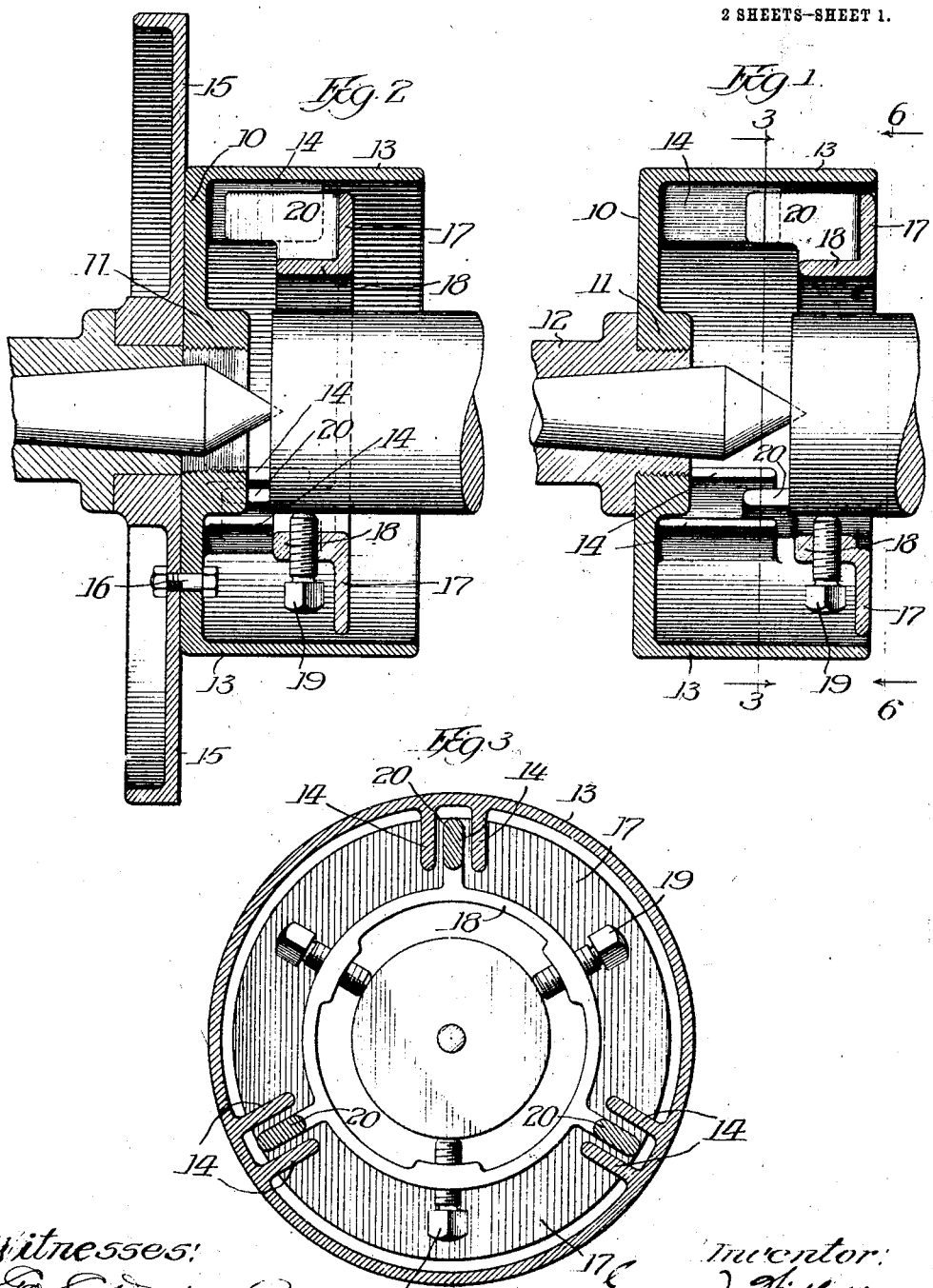

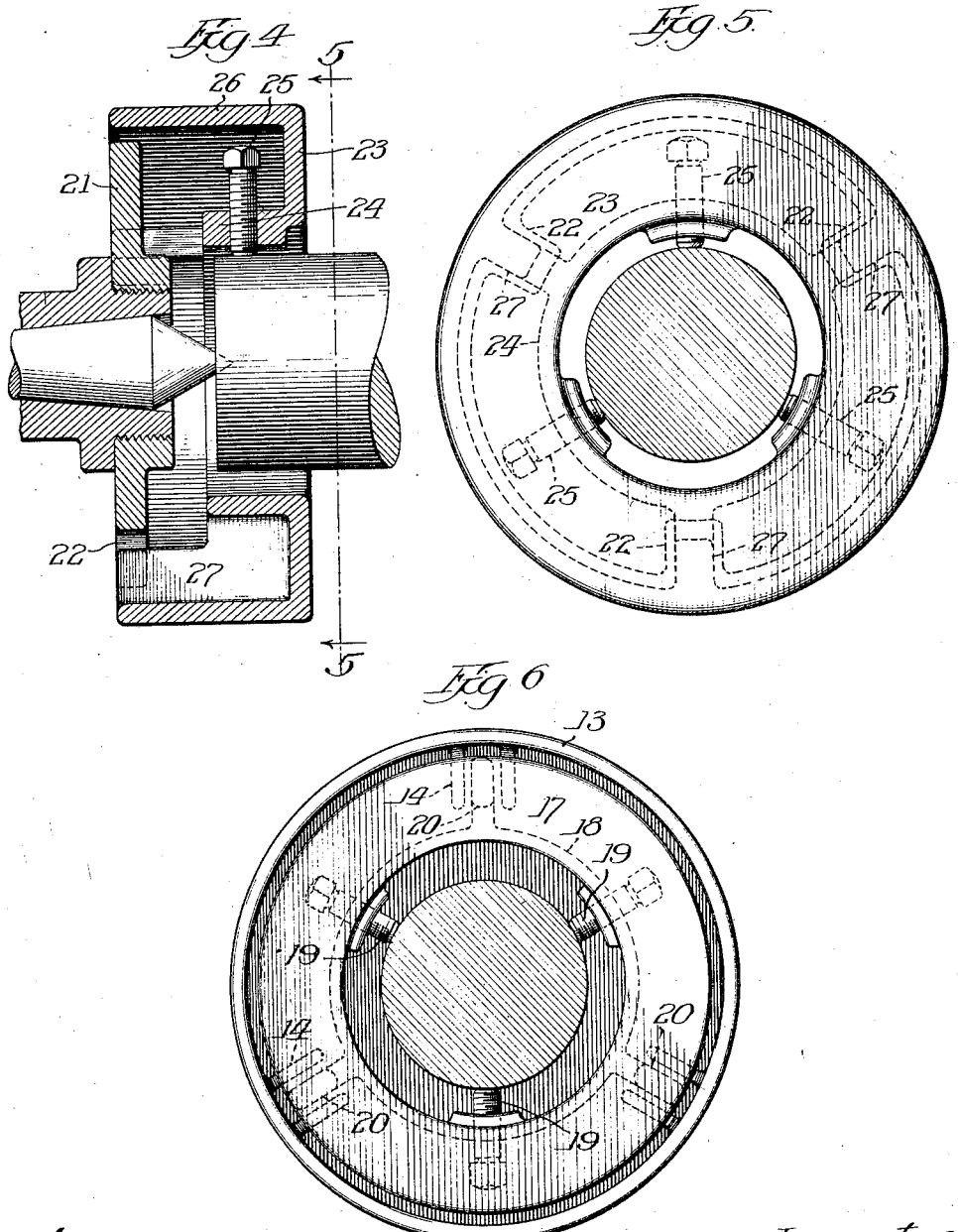

GEORGE J. WILLETT, OF MILWAUKEE, WISCONSIN.

SAFETY LATHE-DOG.

1,046,525.

Specification of Letters Patent. Patented Dec. 10, 1912.

Application filed March 28, 1912. Serial No. 686,815.

*To all whom it may concern:*

Be it known that I, GEORGE J. WILLETT, a citizen of the United States, and resident of Milwaukee, in the county of Milwaukee and State of Wisconsin, have invented certain new and useful Improvements in Safety Lathe-Dogs, of which the following is a specification.

My invention relates to lathes and has particular reference to a novel safety lathe dog.

In the operation of lathes it is the practice to center the work by means of the lathe spindle and to cause its rotation with the lathe head by means of a lathe dog. This dog is usually a clamp having a right-angled projection engaging with a recess in the lathe head. The objection to such a dog is, first, its limited holding power, and, second, the liability of serious accident to the operator through the catching of his sleeve on the work-clamping bolt.

One of the principal objects of my invention is the provision of a clamping device which shall have the maximum holding capacity and which shall be so arranged that no clamping bolts or other parts shall project.

My device presents a smooth circular surface, is economical to manufacture and has a relatively great capacity or range in the size of the work which may be accommodated without change.

My invention will be more readily understood by reference to the accompanying drawings, wherein, Figure 1 is a sectional elevation of a device constructed in accordance with my invention, the spindle of the lathe being threaded and the head, forming a part of my device being threaded thereon; Fig. 2 is a similar view showing my device attached to a lathe which has an irremovable face-plate; in this case the head of my device is bolted to the face-plate; Fig. 3 is a section on the line 3—3 of Fig. 1; Fig. 4 is a sectional elevation of a modified form of the invention; Fig. 5 is a section on the line 5—5 of Fig. 4, and Fig. 6 is a section on the line 6—6 of Fig. 1.

Referring more particularly to the drawings, it will be seen that the device of my invention is composed of two parts, a head and a clamp. The head, as shown in Figs. 1, 2, 3 and 6, is composed of an end wall 10, having a hub 11, threaded on its interior and adapted to be screwed upon the threaded shank of a spindle 12. Projecting from the end wall 10, is a hood or shell 13, which is in the form of a cylinder, the outer surface being smooth and having no projections or openings. Extending inwardly from the shell 13 is a plurality of twin lugs 14, adapted for coöperation with lugs on the clamping member. In the construction shown in Fig. 2, the spindle is not threaded and the face-plate 15 is not adapted for easy removal. Therefore I merely center the head and attach it to the face-plate by means of a plurality of bolts 16. The head just described is so constructed that it will accommodate a large number of sizes of clamping members. Thus it will be found unnecessary to remove the head except in cases where extremely large or small work is to be acted upon.

The clamping member, as best shown in Figs. 3 and 6, is composed of a circular web 17, there being a hollow sleeve 18 projecting therefrom and defining the work-receiving opening. A plurality of clamping bolts 19 are threaded in the sleeve and serve to center and clamp the work. Lugs 20, joined to the web 17 and sleeve 18, are adapted for coöperation with the twin projections 14 on the head and cause the rotation of the clamping member with the head. It will be seen that I have allowed a small amount of play between the coöperating lugs, for a reason well understood by those skilled in the art. When the parts are in assembled relation, the clamping bolts as well as the entire clamping member is contained within the limits of the head; furthermore, the web 17 closes the open end of the cylindrical head and positively prevents the operator from becoming caught by the clamping bolts.

In the construction of Figs. 4 and 5, a modification is shown which, however, does not vary greatly from those already described. In this construction, the head 21 has no overhanging hood, the end wall being provided with a plurality of radial slots 22, for the accommodation of the lugs on the clamping member. The clamping member has an end wall 23, a sleeve 24, accommodating clamping bolts 25, and an overhanging hood or shell 26. Projecting inwardly from the shell 26 are lugs 27, coöperating with the slots 22 in the head. Thus much the same result is secured as in the constructions of Figs. 1, 2, 3 and 6, the parts being reversed. This construction last described is not as desirable as the clamping bolts are not as easily reached for actuation but the device is equally safe.

Other modifications than the one described are possible and I consider such modifications within the scope of my invention as set forth in the annexed claims.

I claim:

1. In a device of the class described, the combination, with a lathe spindle of a head secured thereto, said head being provided with a cylindrical shell, spaced projections in said shell, a dog having lugs coöperating with said projections, work clamping means on said dog, said work clamping means, when the parts are in assembled relation, being entirely confined within the limits of said head, substantially as described.

2. In a device of the class described, the combination with a lathe spindle of a head secured thereto, said head being in the form of a hollow cylinder and provided with a plurality of spaced lugs projecting inwardly from the cylinder wall, and a dog having portions adapted for coöperation with said spaced lugs and provided also with work clamping means, substantially as described.

3. In a device of the class described, the combination with a lathe spindle of a head having an end wall and a hood, a plurality of twin lugs projecting inwardly from said hood, a dog having a plurality of work-clamping bolts and provided with lugs coöperating with the twin lugs on said head, said dog being substantially entirely contained within the limits of said hood when the parts are in operative relation, substantially as described.

GEORGE J. WILLETT.

Witnesses:
P. H. ESTES,
CHAS. F. MASSEY.